United States Patent
Rettig et al.

(10) Patent No.: US 6,252,589 B1
(45) Date of Patent: Jun. 26, 2001

(54) MULTILINGUAL USER INTERFACE FOR AN OPERATING SYSTEM

(75) Inventors: Bjorn C. Rettig, Redmond; Edward S. Miller, Kirkland, both of WA (US); Gregory Wilson, Palo Alto, CA (US); Shan Xu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/134,559

(22) Filed: Aug. 14, 1998

(51) Int. Cl.[7] ............................ G06F 3/00; G06F 9/00
(52) U.S. Cl. ............................ 345/333; 709/331; 704/8
(58) Field of Search .......................... 345/326, 333, 345/335, 339, 347, 348, 352; 709/203, 310, 328, 331; 704/8

(56) References Cited

U.S. PATENT DOCUMENTS

| | | | | |
|---|---|---|---|---|
| 5,416,903 | * | 5/1995 | Malcolm | 345/333 |
| 5,434,776 | * | 7/1995 | Jain | 704/8 |
| 5,499,335 | * | 3/1996 | Silver et al. | 345/340 |
| 5,835,768 | * | 11/1998 | Miller et al. | 709/320 |
| 5,900,871 | * | 5/1999 | Atkin et al. | 345/334 |
| 5,917,484 | * | 6/1999 | Mullaney | 345/333 |
| 6,025,836 | * | 2/2000 | McBride | 345/326 |

FOREIGN PATENT DOCUMENTS

| | | |
|---|---|---|
| 0388148 | 9/1990 | (EP) . |
| 0640913 | 3/1995 | (EP) . |
| 0660233 | 6/1995 | (EP) . |
| 9729433 | 8/1997 | (WO) . |

OTHER PUBLICATIONS

IBM Technical Disclosure Bulletin, US, IBM Corp., New York, "Mechanism for Dynamic Language Switch", vol. 38, No. 9, pp. 571–572 (1995).

IBM Technical Disclosure Bulletin, US, IBM Corp., New York "Dynamic Management of Resources for Different National Languages" vol. 40, No. 9, pp. 171–173 (1997).

* cited by examiner

Primary Examiner—Crescelle N. dela Torre
(74) Attorney, Agent, or Firm—Banner & Witcoff, Ltd.

(57) ABSTRACT

In an operating system, a function to address resources in executable files is modified to redirect calls for resources to language-specific resources responsively to a user-setting defining a selected language. The language-specific resources are contained in alternate language modules through a dynamic addressing scheme that allows the alternate language file suite to be expanded without modification to any central routing facility. The invention provides resource-handling components the capability for handling multiple-language resources without requiring any specific directions from the processes requesting the resources This allows the operating system to provide multilingual support while using existing resource and executable binary files without modification. A user is enabled to select a language for the user interface and the resource loader will automatically redirect calls for resources to the appropriate resources.

58 Claims, 4 Drawing Sheets

MULTILINGUAL USER INTERFACE FOR AN OPERATING SYSTEM

TECHNICAL FIELD

The present invention generally relates to operating systems and more particularly to operating systems that provide an efficient mechanism for switching the user-interface language.

BACKGROUND OF THE INVENTION

A resource is binary data or non binary data, e.g., a text file. In Windows NT® and all other O/S of the Windows® family, resources are binary data Resource data can reside in the executable file of an application, so the executable file is a binary file with code and resource data in it. Processes defined by the code can use the resources in their own binary executable files or other executable files. Resources used by such processes may also reside in resource-only files, for example, resource-only dynamic link libraries (DLLS). A resource may be either standard or user-defined. The data in a standard resource describes an icon, cursor, menu, dialog box, bitmap, enhanced metafile, font, accelerator table, message-table entry, string-table entry, or version. A user-defined resource contains any data required by a specific application. The resources required by operating system processes may be handled in various different ways. Many of these resources include words, symbols, formatting data, etc. that are language-specific. Usually, a particular language is determined by the operating system installation package chosen by the user. If the language of the software is English, only the English language-specific resources will be installed with the operating system. This is convenient because of the large quantity of language-specific resources that would have to be copied on the hard-disk to cover all languages.

Providing a single language for the operating system to support is also convenient because it allows resources to be efficiently loaded and unloaded into and from memory as the need arises. Far too many resources exist for all to reside in memory at all times. To manage the loading and unloading of resources so that resources do not unnecessarily occupy memory when not required, the code that generates the processes requiring the resources and the resources peculiar to the process may be incorporated in the same binary files. When a process is invoked, a binary file containing the code for the process, and the attendant resources, may be loaded into memory or otherwise made accessible to the process. When the process is terminated, the resource and code sections of such a file are unloaded from memory or otherwise made in-accessible. These binary files can be executable programs, dynamic link libraries (DLLs), device drivers, etc. If they were bloated with all the alternative language resources, an excessive amount of memory would be required.

An example of how one operating system handles such resources is as follows. First, a resource finder, an operating system function, is employed to create a handle to the specified resource's info block. A process requiring a resource sends the finder a resource module handle and the resource name, type, and optionally, a language ID. The latter specifies a language specific resource in the resources defined by the resource module handle. The finder returns a handle to the specified resource's info block and the process can call a resource loader to place the resource in memory. The process gives the resource handle and the resource module handle to the resource loader, which places the resource in memory and returns a handle to the memory block containing the resource. The resource is then available to the process. The operating system may then use other devices to free the memory after the process loading it into memory no longer needs it, is terminated, or if other conditions require it.

The above is only one type of resource access facility in an example operating system. Other mechanisms may make resources available in other ways, such as by placing text messages in an output buffer, immediately loading and returning a handle to resource data in a single function call, etc. The common feature of these mechanisms is that they find a resource either in memory or in a disk file or other storage system and make the resource available to the process that requires it. This may involve loading a file from disk into memory or just providing access to the resource by providing a handle or some other device. The file (device, or channel) containing the resource may be in the same file as the code defining the requesting process or another file. The other file could contain code or be a resource-only file. A process may not need explicitly to unload a resource it no longer needs.

With the low cost of disk storage, it may be desirable in some instances for the same installation of an operating system to provide, transparently to the user, appropriate resources for a number of languages. This would allow users of various tongues to share the same computer. The user would log on, select a desired language, and use the computer, thereafter seeing all resource-based operating system features in the chosen language. However, for an operating system built around the above resource management regimes, the options available to modify the operating system to accommodate selectable languages appear quite problematic, as discussed below.

To provide multilingual support, one option might be to provide a different set of binary files for each language. Considering there might be on the order of a thousand binary files containing language-specific resources in an complex operating system and that it might be desired to support many different languages, the number of binary files to be installed would be large indeed. In addition to the labor required to provide for the selection of a language by the user, the redundancy in the resulting mass of files would be tremendous because all language-non-specific resources would be duplicated for each language supported. Not only would the language-non-specific resource require duplication, but also all the code sections.

Another option might be to install the operating system binary files anew, each time a new user requiring a different language logged on. This option is unattractive because it would take a great deal of time.

Still another option might be to provide the different language-specific resources in each binary file. This would eliminate the redundancy of the first option since each binary file would only add language-specific resources. However, this option would require recoding of each binary file, so it also is not an elegant option. Something similar to this is currently done on a very limited basis. Some binary files contain alternate resources, each being preferred depending on the language or country of the user. The code sections of these binary files define processes that address a different resource based on a "guess" as to the preferred language of resource. This guess is made based on the settings of some system parameter, for example, which date format has been selected. So, for example, if a Russian style of date is selected, the resources tagged as Russian might be loaded.

There is at least one type of operating system that now provides for language selection on a limited basis. This operating system provides separate text files for each language. When a process requires a text file resource in a particular language, the operating system addresses the appropriate file. The user can select his default language of choice through a system variable.

As mentioned briefly, at least one current operating system (Windows®) provides some support for the creation of language-specific libraries, for example text messages. A system variable is defined indicating the locale (Note, the locale of a system is not a language setting. Locale is a mixture of language and location) of the operating system installation and this variable can be used by the applications running on the operating system to format messages specifically for the current language. This requires, however, that the process (the application) identify precisely the appropriate language resource and where it is located. As a model for conversion it would entail extensive recoding.

None of the prior art operating system regimes offers a model suggesting how to provide multilingual support by the operating system in a very automatic way. Also, none suggests means of preserving some of the inherent economies of binary files with code and resource sections in the same file. The simple transformations suggested above to provide the desired functionality appear to be unduly expensive and/or bulky in terms of the redundant data required. Any conversion that is readily implemented would likely have to be a system that departs significantly from any of the prior art systems.

Figure 1:
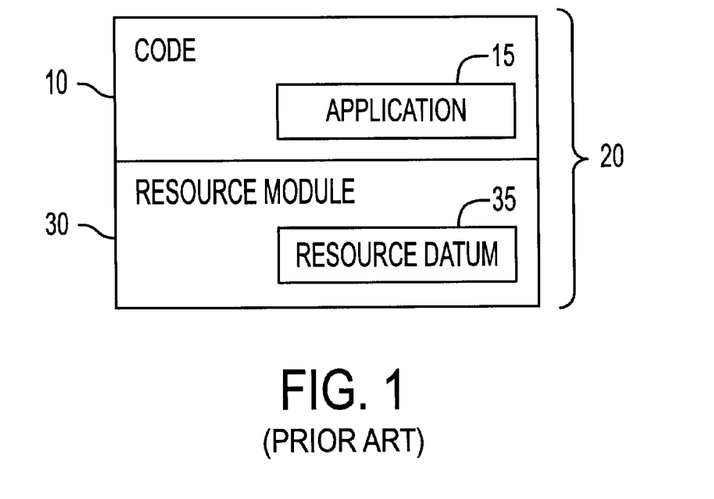
FIG. 1 is a schematic drawing of a binary file containing a code section that defines a process that calls for a resource in a resource section of the same binary file.

Referring to FIG. 1, in a common operation in a prior art operating system, a binary file 20 is loaded. The binary file 20 contains a code section 10 and a resource section 30 and may be any file unit of the operating system or one supplied by a third party. For example, the binary file 20 could be an executable binary, a dynamic link library (DLL), or a device driver. The resource section 30 may contain some of the resources used by the code section, particularly those resources peculiar to the requirements of the processes generated by the code section 10 and which may be unloaded from memory when the processes defined in the code section 10 are no longer required. In other words, the resources 30 are those that may be required by processes encoded in the code section 10 and once those processes are terminated, there is no longer any need to maintain the resources contained in resource section 30 in memory. For example, the binary file 10 could be a core resource or an application that is supplied with the operating system such as a stripped-down text editor. For the editor, for example, when the user terminates the editor program, the resources required by this text editor would no longer be required. The binary file 20, including code 10 and resources 30, would be removed from memory. Of course, the code section 10 could use other resources from other files and may also use other processes as well.

Figure 2:
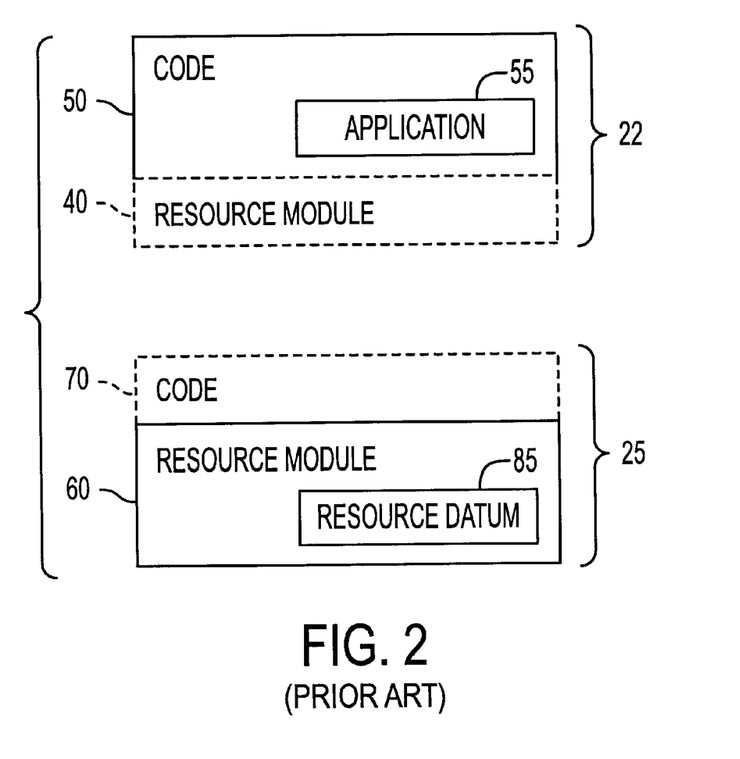
FIG. 2 is a schematic drawing of two binary files, one of which contains code and may or may not contain resources, and the other of which contains resources and may or may not contain code, the code of the first file defining a process that calls resources in the second file.

Referring to FIG. 2, resources 85 and the code 55 that uses it may also be located in separate respective files 25 and 22. For example, the resource 85 addressed by an application 55 defined in a piece of code 50 may be contained in a resource-only DLL or a separate file 25 that contains code 70 and resources 60. The application 55 may reside in a file that also contains resources 40. Another operating system device may be used to find the file by resource type and name. The management (loading and unloading) of the resources may be handled by the resource loader.

Figure 3:
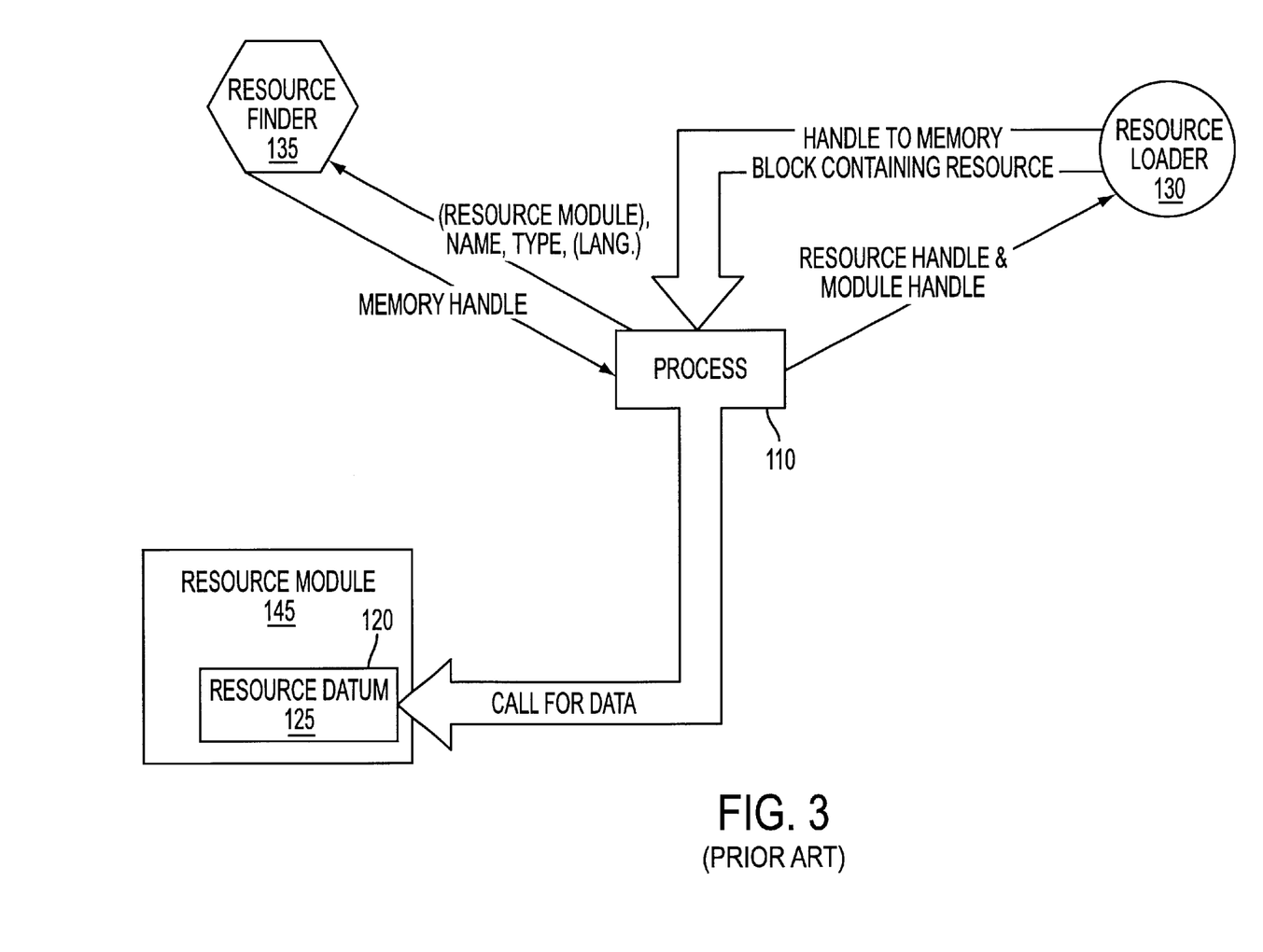
FIG. 3 is a schematic illustration of a resource loader and resource finder being used by a process to retrieve a resource according one embodiment of the prior art.

Referring to FIG. 3, resources are addressed by a process 110 using a resource loader 130 and a resource finder 135. The resource loader is an operating system facility that provides access to a resource datum 125 given a resource module handle and resource handle. The resource module handle, which indicates where the resource datum, specified by the resource name, can be found, is created by the resource finder. The resource name, type, and a language (the latter is optional) are provided to the resource finder 135 which returns a resource module handle. If the resource is in a module other than the one that generated the calling process, the handle of that module must be provided to the resource finder as well. The resource type may specify for example a bitmap, an animated cursor, a font resource, a menu resource, a string-table entry, etc.

The resource loader loads the specified resource into memory. It requires a resource module handle and resource handle. The resource module handle is the module whose executable file contains the resource. The resource handle identifies the resource to be loaded. The resource loader 130 returns a handle to the memory block containing the data associated with the resource. The description shown in FIG. 3 is consistent with either of the situations shown in FIG. 1 or FIG. 2. Note that examples of the above functions are defined in documentation relating to the Windows® APIs FindResource and LoadResource. Note also that the resource may be loaded in a prior operation as well as part of a call for a resource as described above. For example in the Windows® operating system, a call to LoadLibrary could result in the loading of a module into memory.

Figure 4:
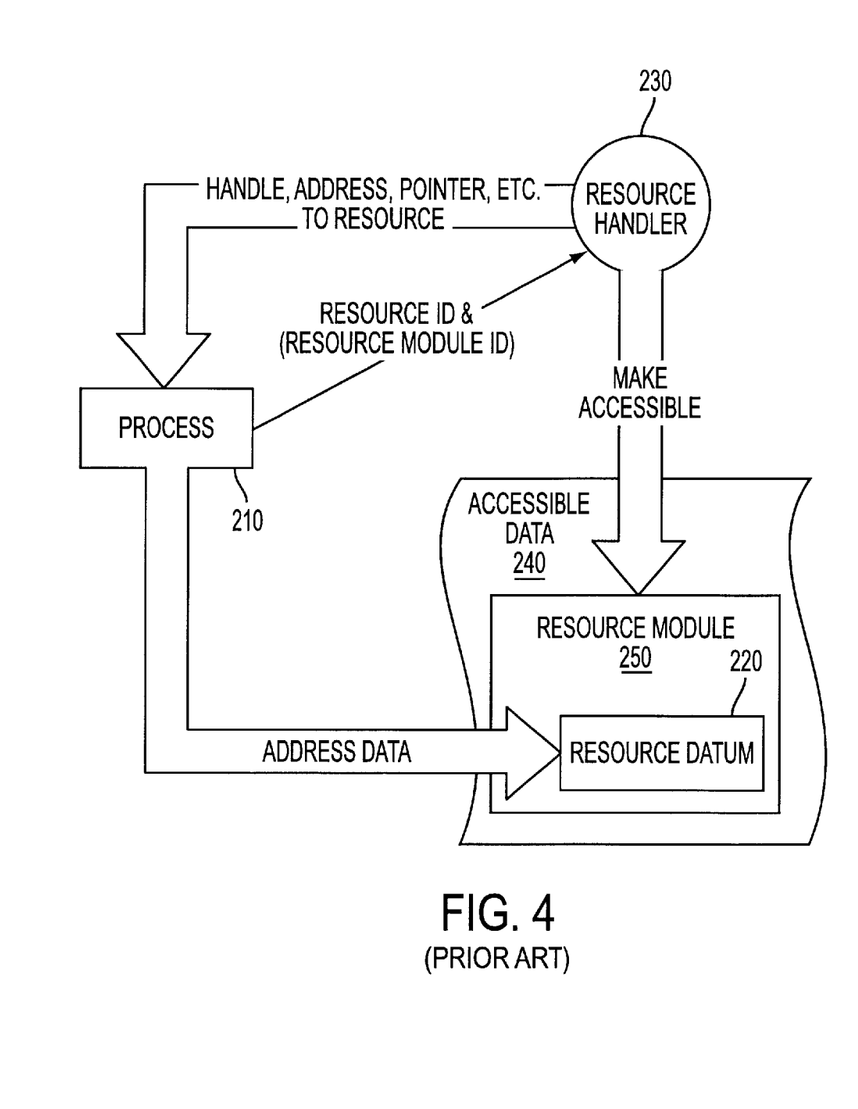
FIG. 4 is a schematic illustration of a resource handler in a generalized description of a process of retrieving resources by a process on a computer.

Referring to FIG. 4, a generalized schematic of how resources may be addressed in an operating system is shown. A resource handler 230 is used by a process 210 to obtain access to a resource datum 220. The resource handler 230 may consist of several different devices provided by the operating system, for example as discussed with reference to FIG. 3. The process identifies the requested resource to the handler 230 and may tell the handler where the resource can be found, such as a file name, identifier of a module 250 or some other information. The resource handler 230 may need to load the resource 220, possibly included in a module 250, into memory or some other means for making the data accessible 240 providing access to the process 210. The process 210 is given a handle, address, pointer, etc. to access the resource 220. The important features of the process described by FIG. 4 are that the process identifies the resource required and the operating system provides the process with access to that resource. The resource may reside on a disk, on another computer connected by a network, provided through a communications port or any other mechanism for transferring data to a process on a computer. The operating system may, as part of the request, transfer the resource to a different medium, say, for example, from disk to memory, before access to the resource by the process is possible.

SUMMARY OF THE INVENTION

An operating system scheme provides resource-handling components that provide features for handling multiple-language resources without requiring any specific directions from the processes requesting the resources. This allows the operating system to provide multilingual support while using existing resource and executable binary files without modification of these elements. That is, a user is enabled to select a language for the user interface and the resource loader will automatically redirect calls for resources to the appropriate resources.

Note that throughout the following description, the notion of loading data into memory is not intended to be construed literally as actually taking data from a file and putting it into memory. In the operating system context contemplated by the invention, the actual loading of data into physical memory is performed by low level operating system functions. Each process may have a virtual memory space that does not coincide with actual physical memory. When, in the following discussion, the step of loading and unloading data from memory is spoken of, it is intended to be interpreted broadly as any operating system function that makes data accessible to the process.

From the standpoint of the processes requesting resources, the interactions with operating system devices are the same as for handling resources of a single language. The operating system resource-handling components for finding resources and returning them to a requesting process are modified to dynamically generate a path to an alternate-language resource module. The generation of the path may be in response to a resource identifier and an optional module handle provided by the process requesting the resource and also in response to a system-wide operating user-setting specifying a chosen language for the user-interface. The path to the alternate-language resource is used instead of the module handle, if any, supplied by the process.

By generating the module handle dynamically, the operating system may be expanded without modifications to any permanent facility to correlate base module handles (the ones used by the calling process) and the alternate-language resource modules. Since the look-up table is generated dynamically, it is automatically created for the purpose of saving steps and is never out of date. When new modules are added to the operating system, alternate language modules can be added and the algorithm used to generate alternate module handles without any central data housekeeping. As long as there is no collision between a new module name and an existing module name, the module and any code using it, or any binary file containing code and resources, may be added to the operating system without making any centralized changes.

The system automatically loads and frees alternate-language modules as necessary, and transparently to the user and the processes requesting resources. Alternate language resources reside in modules (dynamic link libraries or DLLs, as defined in Windows® parlance, in a preferred implementation), each uniquely specified by a path and module name as:

<module_path>\mui\<language_ID>\<module_name>

In other words, the operating system loads an alternate-language resource module from a language-specific subdirectory of the original module's load path. The path and module name are dynamically generated using the same name as the original module name supplied by the calling process. The element <language_ID> may be some compact code representing the language. For example, it could be based on ISO 639 language standard abbreviation plus, possibly, a sublanguage designator or a Win32 language id including primary and secondary components.

Alternate languages may be requested with varying degrees of specificity. That is, one may request (French) French, Swiss French, or Canadian French at one level of specificity or just French at a lower level of specificity. For the process of generating an alternate language resource module handle to be robust, the algorithm may involve multiple steps to enable it to reconcile a system-level request for a user-interface language with one degree of specificity and an availability of alternate language resources provided with another degree of specificity. Suppose, for example, the user requests Swiss French upon logging into the operating system. This specifies a user-variable that mandates that for all process able to comply, that Swiss French resources should be used. The resource loader (or library loader) algorithm that generates alternate-language resources should be able to deal with situations where only an approximation to the requested language is available. Suppose in the above example, that only French and various other primary alternate languages are available and not specifically Swiss French. It is desirable for the algorithm to load the French alternate language resource upon a request rather than to make some other default choice that is not as close to the system-level mandate indicated in the system user language ID. Thus, multiple levels of approximation may be defined for the algorithm, for example, as follows.

First, the algorithm may determine if, in the module path specified by "<module_path>\" there exists a subdirectory with an identifier equivalent to the current user language ID, that is, with the name "\mui\<language_ID>\". If this first test fails, the algorithm may determine if there exists a subdirectory of "<module_path>\" with an identifier equivalent to the primary language ID corresponding to the current user language ID, that is, with the name "\mui\<primary_language_ID>\". If no system user language ID is specified, the algorithm may be able to use a surrogate to resolve a subdirectory, for example, some preference that suggests the locality of the user such as a preference as to date or monetary format conventions. Alternatively, a language-neutral alternate resource module may be invoked. Other steps, which may be placed in any desired priority, could be the selection of a default alternate language resource subdirectory, a substitute language where the one specified by the user language ID is not available but a fair substitute language spoken in the likely locale is. For example, if Canadian French is requested in the user language ID, and neither Canadian French nor French are available, but Canadian English is available, then the latter could be used. The above process of identifying preferred alternate resources according to a priority system allows the specificity of alternate language resources to be increased. If the operating system ships with only primary languages (e.g., English, but no British English, Canadian English, etc.) the user may add more specific languages later and the user's choice implemented transparently and automatically.

To speed processing the mapping obtained by generating each alternate module path dynamically is preserved in a look-up table. When a calling process calls the same resource, the alternate resource module may be obtained from the look-up table instead of generating the path and handle dynamically. Note that by preserving the result of the dynamic generation of an alternate resource module ID, the steps of the robust algorithm discussed above do not have to be repeated each time a request for a resource is made.

In addition, a clean-up table is generated to help the modified resource loader load and free memory as system requirements permit. The clean up table lists the loaded alternate resource modules and the processes that requested them. When, for example, the process requesting a resource is terminated, the resource module requested by the terminated process may be unloaded from memory.

Note that the operating system keeps track of resources that are loaded and unloaded by generating entries in a loader data table. The loader data table indicates the processes that required the loading of resource modules so that these modules can be unloaded when the process terminates or as other system requirements indicate. For modules that are loaded by the applications directly using, for example in Windows NT, the LoadLibraryEx function, the module's identity may not be "known" to the resource loader described above. That is, no loader data table entry is generated. In this case, the facility that loads the resource module (e.g., LoadLibrary) may inquire as to the existence of an alternate-language resource and load it instead of the module requested by the application. If the application or process does use an operating system facility that does generate a loader data table entry, then the module would not have to be loaded until a request is made for a resource from the resource loader by the application or other process.

According to an embodiment, the invention is a method performed by an operating system. The method redirects a call by a calling process for a first datum residing in a first binary file. The following steps are performed: storing in an operating user-setting independently of the calling process, a language identifier; when a second binary file corresponding to the language identifier and also to an identifier of either the first datum or the first binary file exists: (1) dynamically generating a path to the second binary file responsively to the language identifier and the either the first datum or the first binary file; (2) storing the path in a look-up table correlating a process module identifier identifying the first binary file and an alternate module identifier identifying the second binary file; and (3) making an alternate datum in the second binary file accessible to the calling process instead of the first datum.

According to another embodiment, the invention is also a method performed by an operating system. The method redirects a call by a calling process for a first resource datum residing in a first binary file containing both executable code defining the calling process and resource data. The calling process is defined in the code. The method has the following steps: storing in a variable, independently of the calling process, a language identifier, when a second binary file corresponding to the language identifier and also to either the first resource datum or the first binary file exists: (1) dynamically generating a path to the second binary file responsively to the language identifier and the either the first resource datum or the first binary file; (2) making an alternate resource datum in the second binary file accessible to the calling process instead of the first resource datum.

According to still another embodiment, the invention is a method of adding multilingual capability to an operating system having functions to address first resource data in executable binary files. The method includes the following steps: adding a selectable user-setting for storing a selected language identifier; adding at least one alternate language resource file containing resource data each corresponding to a respective one of the first resource data; and modifying a resource loader to redirect calls for each of the first resource data to a respective one of the alternate language resource data responsively to a selected language stored in the selected language identifier.

According to an embodiment, the invention is a method performed by an operating system. The method addresses data responsively to a call by a calling process for a first datum. The method has the following steps: determining an existence of an alternate language file corresponding to the first datum; returning at least one datum from the alternate language file to the calling process when a result of the step of determining is an indication that the alternate language file exists; returning the first datum to the calling process when a result of the step of determining is an indication that the alternate language file does not exist.

According to an embodiment, the invention is a method performed by an operating system. The method redirects a call by a calling process for a first datum residing in a first binary file. The following steps are performed: storing in an operating system variable independently of the calling process for each user, a language identifier; responsively to a detection of a second binary file corresponding to the language identifier and also to an identifier of either the first datum or the first binary file: (1) dynamically generating a path to the second binary file responsively to the language identifier and the either the first datum or the first binary file; (2) storing the path in a look-up table correlating a process module identifier identifying the first binary file and an alternate module identifier identifying the second binary file; and (3) making an alternate datum in the second binary file accessible to the calling process instead of the first datum.

DETAILED DESCRIPTION OF THE EMBODIMENTS

Figure 5:
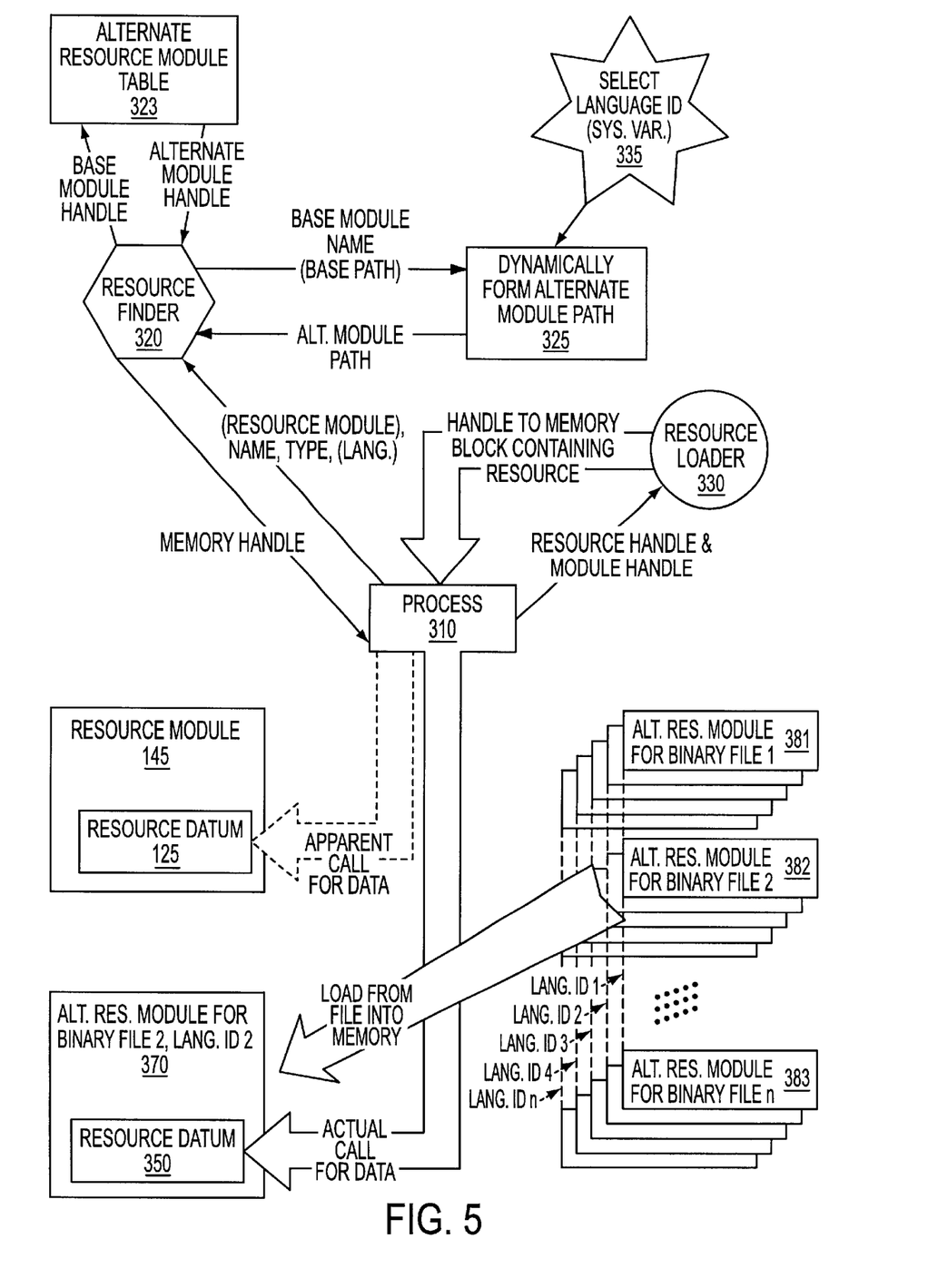
FIG. 5, is a schematic illustration of a process of calling for a resource datum through an operating system in a modification of the prior art process shown in FIG. 3.

Referring to FIG. 5, a process of calling for a resource datum through an operating system in a modification of the prior art process shown in FIG. 3, is shown. Processes within the resource loader 130 and resource finder 135, described with reference to FIG. 3, are modified to produce a process as illustrated in FIG. 5. In overarching terms, the process of FIG. 5 redirects a call by the process for a particular resource to an alternate-language resource so that the process receives a resource associated with a selected user-interface language instead of the default resource for the process. In an embodiment, loading of alternate resources only "kicks in" if the process did not specify the language it wants to load. In other words, a process tries to load resources and doesn't really care about which language. In the prior-art system the resource loader would return the resources from either the resource section of the module itself or from an external module, which the process specified to load resources from. In the present embodiment of a multilingual user interface system, the resource loader will load alternate resources if the process didn't specify a particular language or other particular classification for the resource. The process requests a memory handle from the resource finder 320 just as in the prior art embodiment of FIG. 3. However, in this case, the handle is a handle referring to an alternate language resource, if one is available. The resource finder tries to identify a resource indicated by a selected user-interface language ID 335.

Selected user-interface language ID 335 is a user-setting. The selected user-interface language ID 335 could be established, for example, by a user logging in and selecting a language from a list of options. The selected user-interface language ID 335 is then stored until changed.

A process 310 requests a memory handle for a resource by sending to a resource finder 320 a resource name and type. If the resource were in a module other than the one defining the calling process 310, the resource module handle would also be sent to the resource finder 320. If the module handle is not sent, the resource finder already has access to the module handle from a loader data table because the module is the same as the one generating the process requesting the resource. (As discussed in the background section, resource finder and resource loader are often used to access resources in the same binary file as the code generating the requesting process) It is also possible for the process to request a resource that is language-specific and the process of satisfying such a request may be outside the steps relating to the invention and satisfied by prior art methods such as the LoadResource function provided by the Microsoft Windows NT® operating system. In the latter case, a language ID may be passed to the resource finder.

The operating system is modified to maintain a table of alternate resource module handles 323, which have been generated previously by calls to the resource finder 320. So if another process already requested a resource from the same module and the module is already correlated to an alternate resource module, the alternate module handle can be quickly obtained from the alternate resource module table 323. If there is no entry for the resource, the operating system generates an alternate module path dynamically.

To dynamically generate an alternate module path, an algorithm 325 is employed. The algorithm 325 may be based on some assumed organization of resource files, which indicate whether an alternate language resource file exists for the specified resource. In the present embodiment, the alternate language resource files are located in subdirectories of the requested module's path, each distinguished by a filename correlated uniquely to a language identifier. Within each language's subdirectory are stored the alternate language resource files, each named after the original module.

<module_path>\mui \<language_ID>\<module_name>
In other words, the operating system loads an alternate-language resource module from a language-specific subdirectory of the original module's load path. If the original module, for a system that was not multilingual enabled, was "<path 1>\<filename 1>," the path for the alternate language module would be "<path 1>\mui\<language ID 1> \ <filename 1>" assuming the language indicated by selected user-interface language ID 335 is "language ID 1."

The organization of the alternate language resources can be done in various alternative ways. Breaking them down into language-specific modules, each corresponding to the regular module (the one ordinarily requested in a single-language operating system) avoids any need for additional memory as would occur if for each resource module, the resources of the various languages were combined into a single module.

Given the path structure used to store modules, it is straightforward to construct a path for an alternate language module corresponding to any language indicated by the selected user-interface language ID 335 and the original called-for path and module name. This path is used by the resource finder 320 to provide a resource handle. The creation of the resource handle is done in the same way as in the prior art. The difference is that the resource handle in this instance directs the process to a resource datum 350, which was identified in a subdirectory of the original module path. In FIG. 5, the resource datum 350 was in an alternate resource module for "binary file 2" where the selected user interface language ID was language ID 2.

The path and module name are dynamically generated using the same name as the original module name supplied by the calling process. The element <language_ID> may be some compact code representing the language. For example, it could be based on ISO 639 language standard abbreviation plus, possibly, a sublanguage designator or a Win32 language id including primary and secondary components.

In a preferred embodiment of the invention, the algorithm is robust in that it does much more than simply construct a path assuming there exists an alternate-language resource for the requested data. Alternate languages may be requested with varying degrees of specificity. Also, it is possible that no alternate-language resource may be available or that an alternate resource is available, the resource being different from the base resource in some respect other than language. The algorithm and associated processes are robust enough to deal with and exploit these situations as well as the straightforward scenario depicted in FIG. 5.

The selected user interface language may be very specific. For example, a user may request French, Swiss, or Canadian French. The algorithm may involve multiple steps to enable it to reconcile a system-level request for a user-interface language with one degree of specificity and an availability of alternate language resources provided with another degree of specificity. If the user requests French French upon logging into the operating system, only an approximation to the requested language may available. To deal with such situations, the algorithm and associated processes may operate according to a built-in hierarchy of steps as follows.

First, the algorithm may determine if, in the module path specified by "<module_path>\mui\" there exists a subdirectory with an identifier equivalent to the current user language ID, that is, with the name "544 <language_ID>\". If this first test fails, the algorithm may determine if there exists a subdirectory of "<module_path>\mui\" with an identifier equivalent to the primary language ID corresponding to the current user language ID, that is, with the name "\<primary_language_ID>\". If no system user language ID is specified, the algorithm may be able to use a surrogate to resolve a subdirectory, for example, some preference that suggests the locality of the user such as a preference as to date or monetary format conventions. Alternatively, a language-neutral alternate resource module may be invoked. Other steps, which may be placed in any desired priority, could be the selection of a default alternate language resource subdirectory, a substitute language where the one specified by the user language ID is not available but a predefined substitute language is often spoken in the likely locale is, for example, if Canadian French is requested in the user language ID, and English is available. The above process of identifying preferred alternate resources according to a priority system allows the specificity of alternate language resources to be increased. If the operating system ships with only primary languages (e.g., English, but no British English, Canadian English, etc.) the user may add more specific languages later and the user's choice implemented transparently and automatically.

Note that the above functionality does not interfere with the normal requests for a resource for a specific language, such as made with the FindResourceEx function in Windows®. If a specified language ID is provided by the requesting process, the alternate-language resource scheme above would not reroute the request to another resource module.

After the algorithm 325 that forms the path has settled on a resource path, version checks and any other integrity checks can be performed on the identified file before making it accessible to the requesting process. If as a result of the processes described with reference to FIG. 5, the alternate-language module 370 was newly placed in memory or otherwise made accessible by the call to resource finder 320, a new entry may be placed in the alternate resource module table 323. Finally a handle may be returned to the calling process to allow the process to access the requested resource. The latter may involve a step to another function, the resource loader 330, to load the data into memory and provide a handle for the process to use to access the data.

Note that where FIG. 5 and the attendant discussion indicate that the module is loaded into memory, this may not need to be done explicitly by the resource finder or even the resource loader. The only requirement is the appropriate data is made available to the process. The operating system may handle the actual movement of data through its I/O and memory management facilities. The import of what is described above with reference to FIG. 5 is that a request by a process for a resource, whose guts are different for different languages, is automatically redirected transparently to the requesting process. The code defining the process does not need to be modified for the operating system to be multilingual enabled. FIG. 5 and the attendant discussion describe the process of redirecting requests for data in the context of resources that are incorporated in binary files that also contain executable code. The same basic formula can be expanded to embrace the access of data in resource-only files, for example, DLLs.

Note that in the above discussion, where a process calls for data to be loaded into memory or unloaded from memory, such a step should be viewed in the broader sense of being mapped into the address space of a process. This is because the operating system facilities for mapped I/O blur the concrete notions connected with loading data from disk into memory. In other words, current operating systems make it possible to allow a process to access data on a disk following steps without necessarily being involved in the explicit steps of loading data into memory, since this concrete step can be handled transparently by the operating system's I/O system and virtual memory management functions.

The above process may map the alternate resource module as a simple data file into the address space of the calling process. The details underlying this process are known in the prior art, for example in Windows®, this is done by code defining an operating system function called LoadLibrary.

What is claimed is:

1. In an operating system, a method for redirecting a call by a calling process for a first datum residing in a first binary file, said method comprising the steps of:

storing in a variable independently of said calling process, a language identifier;

when a second binary file, corresponding to said language identifier and also to an identifier of either said first datum or said first binary file, is found:

dynamically generating a path to said second binary file responsively to said language identifier and said either said first datum or said first binary file;

storing said path in a look-up table correlating a process module identifier identifying said first binary file and an alternate module identifier identifying said second binary file; and making an alternate datum in said second binary file accessible to said calling process instead of said first datum.

2. A method as in claim 1, wherein said step of making includes mapping said alternate datum into an address space of said calling process.

3. A method as in claim 2, wherein said calling process is defined in a code portion of said first binary file.

4. A method as in claim 2, wherein said step of dynamically generating includes generating a path that includes a language-specific subdirectory.

5. A method as in claim 2, wherein said step of making includes generating a handle to said alternate datum for use by said calling process in accessing said alternate datum.

6. A method as in claim 2, wherein said second binary file includes both code and resource data, said alternate datum being at least a portion of said resource data.

7. A method as in claim 2, further comprising the step of, when a second binary file corresponding to said language identifier and also to either said first datum or said first binary file is not found, making said first datum accessible to said calling process.

8. A method as in claim 2, wherein said first datum is one of data defining an icon, a cursor, a menu, a dialog box, a bitmap, an enhanced metafile, a font, an accelerator table, a message-table entry, a string-table entry, or a version.

9. A method as in claim 1, wherein said step of dynamically generating includes generating a path that includes a language-specific subdirectory.

10. A method as in claim 9, wherein said step of making includes generating a handle to said alternate datum for use by said calling process in accessing said alternate datum.

11. A method as in claim 9, wherein said second binary file includes both code and resource data, said alternate datum being at least a portion of said resource data.

12. A method as in claim 9, further comprising the step of, when a second binary file that corresponds to said language identifier and also to either said first datum or said first binary file is not found, making said first datum accessible to said calling process.

13. A method as in claim 9, wherein said first datum is one of data defining an icon, a cursor, a menu, a dialog box, a bitmap, an enhanced metafile, a font, an accelerator table, a message-table entry, a string-table entry, or a version.

14. A method as in claim 1, wherein said step of making includes generating a handle to said alternate datum for use by said calling process in accessing said alternate datum.

15. A method as in claim 14, wherein said second binary file includes both code and resource data, said alternate datum being at least a portion of said resource data.

16. A method as in claim 14, further comprising the step of, when a second binary file that corresponds to said language identifier and also to either said first datum or said first binary file is not found, making said first datum accessible to said calling process.

17. A method as in claim 14, wherein said first datum is one of data defining an icon, a cursor, a menu, a dialog box, a bitmap, an enhanced metafile, a font, an accelerator table, a message-table entry, a string-table entry, or a version.

18. A method as in claim 1, wherein said second binary file includes both code and resource data, said alternate datum being at least a portion of said resource data.

19. A method as in claim 18, further comprising the step of, when a second binary file that corresponds to said language identifier and also to either said first datum or said first binary file is not found, making said first datum accessible to said calling process.

20. A method as in claim 18, wherein said first datum is one of data defining an icon, a cursor, a menu, a dialog box, a bitmap, an enhanced metafile, a font, an accelerator table, a message-table entry, a string-table entry, or a version.

21. A method as in claim 1, further comprising the step of, when a second binary file that does not correspond to said language identifier and also to either said first datum or said first binary file, making said first datum accessible to said calling process.

22. A method as in claim 21, wherein said first datum is one of data defining an icon, a cursor, a menu, a dialog box, a bitmap, an enhanced metafile, a font, an accelerator table, a message-table entry, a string-table entry, or a version.

23. A method as in claim 1, wherein said first datum is one of data defining an icon, a cursor, a menu, a dialog box, a bitmap, an enhanced metafile, a font, an accelerator table, a message-table entry, a string-table entry, or a version.

24. A method as in claim 1, wherein said first datum is a resource datum.

25. A method as in claim 1, wherein said calling process is defined in a code portion of said first binary file.

26. In an operating system, a method for redirecting a call by a calling process for a first resource datum residing in a first binary file containing both executable code defining said calling process and resource data, said calling process being defined in said code, said method comprising the steps of:
  storing in a variable independently of said calling process, a language identifier;
  when a second binary file, corresponding to said language identifier and also to either said first resource datum or said first binary file, is found:
    dynamically generating a path to said second binary file responsively to said language identifier and said either said first resource datum or said first binary file;
    making an alternate resource datum in said second binary file accessible to said calling process instead of said first resource datum.

27. A method as in claim 26, wherein said step of making includes mapping said alternate resource datum into an address space of said calling process.

28. A method as in claim 27, wherein said step of dynamically generating includes generating a path that includes a language-specific subdirectory.

29. A method as in claim 27, wherein said step of making includes generating a handle to said alternate resource datum for use by said calling process in accessing said alternate resource datum.

30. A method as in claim 27, wherein said second binary file includes both code and resource data.

31. A method as in claim 27, further comprising the step of when a second binary file that corresponds to said language identifier and also to either said first resource datum or said first binary file is not found, making said first resource datum accessible to said calling process.

32. A method as in claim 27, wherein said first resource datum is one of data defining an icon, a cursor, a menu, a dialog box, a bitmap, an enhanced metafile, a font, an accelerator table, a message-table entry, a string-table entry, or a version.

33. A method as in claim 26, wherein said step of dynamically generating includes generating a path that includes a language-specific subdirectory.

34. A method as in claim 33, wherein said step of making includes generating a handle to said alternate resource datum for use by said calling process in accessing said alternate resource datum.

35. A method as in claim 33, wherein said second binary file includes both code and resource data.

36. A method as in claim 33, further comprising the step of, when a second binary file that corresponds to said language identifier and also to either said first resource datum or said first binary file is not found, making said first resource datum accessible to said calling process.

37. A method as in claim 33, wherein said first resource datum is one of data defining an icon, a cursor, a menu, a dialog box, a bitmap, an enhanced metafile, a font, an accelerator table, a message-table entry, a string-table entry, or a version.

38. A method as in claim 26, wherein said step of making includes generating a handle to said alternate resource datum for use by said calling process in accessing said alternate resource datum.

39. A method as in claim 38, wherein said second binary file includes both code and resource data.

40. A method as in claim 38, further comprising the step of, when a second binary file that corresponds to said language identifier and also to either said first resource datum or said first binary file is not found, making said first resource datum accessible to said calling process.

41. A method as in claim 38, wherein said first resource datum is one of data defining an icon, a cursor, a menu, a dialog box, a bitmap, an enhanced metafile, a font, an accelerator table, a message-table entry, a string-table entry, or a version.

42. A method as in claim 26, wherein said second binary file includes both code and resource data.

43. A method as in claim 42, further comprising the step of, when a second binary file that corresponds to said language identifier and also to either said first resource datum or said first binary file is not found, making said first resource datum accessible to said calling process.

44. A method as in claim 42, wherein said first resource datum is one of data defining an icon, a cursor, a menu, a dialog box, a bitmap, an enhanced metafile, a font, an accelerator table, a message-table entry, a string-table entry, or a version.

45. A method as in claim 26, further comprising the step of, when a second binary file that corresponds to said language identifier and also to either said first resource datum or said first binary file is not found, making said first resource datum accessible to said calling process.

46. A method as in claim 45, wherein said first resource datum is one of data defining an icon, a cursor, a menu, a dialog box, a bitmap, an enhanced metafile, a font, an accelerator table, a message-table entry, a string-table entry, or a version.

47. A method as in claim 26, wherein said first resource datum is one of data defining an icon, a cursor, a menu, a dialog box, a bitmap, an enhanced metafile, a font, an accelerator table, a message-table entry, a string-table entry, or a version.

48. A method of adding multilingual capability to an operating system having functions to address first resource data in executable binary files, the method comprising the steps of:
  adding a selectable user-setting for storing a selected language identifier;
  adding at least one alternate language resource file containing resource data each corresponding to a respective one of said first resource data; and
  modifying a resource loader to redirect calls for each of said first resource data to a respective one of said alternate language resource data responsively to a selected language stored in said selected language identifier.

49. In an operating system, a method of addressing data responsively to a call by a calling process for a first datum stored in a first binary file, comprising the steps of:

determining an existence of an alternate language file corresponding to said first datum;

when a result of said step of determining is an indication that said alternate language file exists dynamically generating a path to said alternate language file based on a language identifier and said first datum and returning to said calling process at least one datum from said alternate language file, rather than from said first binary file;

when a result of said step of determining is an indication that said alternate language file does not exist, returning said first datum to said calling process.

50. In an operating system, a method for redirecting a call by a calling process for a first datum residing in a first binary file, said method comprising the steps of:

storing in a variable independently of said calling process, a language identifier;

responsively to a detection of a second binary file, corresponding to said language identifier and also to an identifier of either said first datum or said first binary file:

dynamically generating a path to said second binary file responsively to said language identifier and said either said first datum or said first binary file;

storing said path in a look-up table correlating a process module identifier identifying said first binary file and an alternate module identifier identifying said second binary file; and making an alternate datum in said second binary file accessible to said calling process instead of said first datum.

51. In a computer operating system, a method of dynamically redirecting a call by a calling process for a default resource stored in a default binary file to an alternate resource stored in an alternate binary file, the method comprising the steps of:

finding the alternate resource, wherein the alternate resource corresponds to both a previously stored user interface language identifier and an identifier of either the default resource or the default binary file;

dynamically generating a path to the alternate binary file based on the user interface language identifier and either the default resource or the default binary file;

dynamically redirecting the call for the default resource to the alternate resource by making the alternate resource, rather than the default resource, accessible to the calling process.

52. The method of claim 51 further comprising the steps of:

storing the dynamically generated path in a look-up table that correlates the default resource with the alternate resource to produce a stored dynamically generated path; and using the stored dynamically generated path to redirect to the alternate resource a subsequent call for the default resource.

53. The method of claim 51 wherein the alternate resource binary file is stored in a subdirectory of a directory in which the default binary file is stored, the subdirectory corresponding to the user interface language identifier.

54. The method of claim 51, wherein the step of dynamically redirecting the call for the default resource to the alternate resource by making the alternate resource, rather than the default resource, accessible to the calling process further comprises the step of mapping the alternate resource into an address space of the calling process.

55. The method of claim 51, wherein the calling process is defined in a code portion of the default binary file.

56. The method of claim 51, wherein the step of dynamically redirecting the call for the default resource to the alternate resource by making the alternate resource, rather than the default resource, accessible to the calling process further comprises the step of generating a handle to the alternate resource for use by the calling process in accessing the alternate resource.

57. The method of claim 51, further comprising the step of, when an alternate binary file corresponding to the user interface language identifier and also to either the default resource or the default binary file is not found, making the default resource accessible to the calling process.

58. The method of claim 51, wherein the default resource is one of data defining an icon, a cursor, a menu, a dialog box, a bitmap, an enhanced metafile, a font, an accelerator table, a message-table entry, a string-table entry, or a version.

* * * * *